United States Patent
Jin

(10) Patent No.: US 10,228,906 B2
(45) Date of Patent: Mar. 12, 2019

(54) ELECTRONIC APPARATUS AND CONTROLLING METHOD THEREOF

(71) Applicant: SAMSUNG ELECTRONICS CO., LTD., Suwon-si (KR)

(72) Inventor: Jang-ho Jin, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/490,994

(22) Filed: Apr. 19, 2017

(65) Prior Publication Data

US 2017/0345421 A1    Nov. 30, 2017

Related U.S. Application Data

(60) Provisional application No. 62/343,037, filed on May 30, 2016.

(30) Foreign Application Priority Data

Aug. 17, 2016  (KR) .................. 10-2016-0104465

(51) Int. Cl.
  *G10L 21/00*   (2013.01)
  *G06F 3/16*    (2006.01)
  *G10L 15/28*   (2013.01)

(52) U.S. Cl.
  CPC .............. *G06F 3/167* (2013.01); *G10L 15/28* (2013.01)

(58) Field of Classification Search
  CPC .... H04W 52/0251; H04W 12/06; G10L 15/30
  (Continued)

(56) References Cited

U.S. PATENT DOCUMENTS 5,479,490 A    12/1995  Nakashima
6,567,775 B1 *  5/2003  Maali ................ G06K 9/6293
                                        704/231

(Continued)

FOREIGN PATENT DOCUMENTS

JP    200241083 A    2/2002
KR    100641148 B1   11/2006
(Continued)

OTHER PUBLICATIONS

Hyundai HCN, "Hyundai HCN Smart—We Inform You How to Use a Service and Installation Methods", Published Retrieved Nov. 14, 2016, URL:http://web.archive.org/web/20141018051650/http://www.hcn.co.kr/ur/bs/tv/tvService.hcn?method=man_02&p_menu_id=090306, Total 4 pages including English Translation.

*Primary Examiner* — Huyen Vo
(74) *Attorney, Agent, or Firm* — Sughrue Mion, PLLC

(57) ABSTRACT

An electronic apparatus and a controlling method thereof are provided. The electronic apparatus includes a communicator configured to communicate with an external apparatus including a microphone, a storage configured to store a voice recognition application and a middleware which relays the voice recognition application, and a processor configured to, in response to receiving an initiation signal from the external apparatus through the communicator, control the communicator to generate a microphone activation signal for activating the microphone using the middleware, transmit the generated microphone activation signal to the external apparatus, generate a voice recognition application signal for loading the voice recognition application, and initiate an operation of the voice recognition application.

20 Claims, 12 Drawing Sheets

(58) Field of Classification Search
USPC ............ 704/200–257, 270, 270.1, 275
See application file for complete search history.

(56) References Cited

U.S. PATENT DOCUMENTS

| | | | |
|---|---|---|---|
| 2009/0248413 A1* | 10/2009 | Liu | G10L 15/30 |
| | | | 704/246 |
| 2014/0012587 A1* | 1/2014 | Park | H04W 12/06 |
| | | | 704/275 |
| 2015/0106099 A1 | 4/2015 | Choi et al. | |
| 2016/0112792 A1 | 4/2016 | Lee et al. | |
| 2016/0119710 A1 | 4/2016 | Mallinson et al. | |
| 2016/0127816 A1 | 5/2016 | Mickelsen et al. | |
| 2016/0171976 A1* | 6/2016 | Sun | H04W 52/0251 |
| | | | 704/233 |

FOREIGN PATENT DOCUMENTS

| | | |
|---|---|---|
| KR | 1020090025939 A | 3/2009 |
| KR | 1020130134545 A | 12/2013 |
| KR | 1020150043807 A | 4/2015 |
| KR | 1020160045463 A | 4/2016 |

\* cited by examiner

ELECTRONIC APPARATUS AND CONTROLLING METHOD THEREOF

CROSS-REFERENCE TO RELATED APPLICATIONS

This application claims the benefit of U.S. Provisional Application No. 62/343,037, filed in the U. S. Patent and Trademark Office on May 30, 2016, and priority from Korean Patent Application No. 10-2016-0104465, filed in the Korean Intellectual Property Office on Aug. 17, 2016, the disclosures of which are incorporated herein by references in their entireties.

BACKGROUND

1. Field

Methods and apparatuses consistent with example embodiments relate to an electronic apparatus and a controlling method thereof, and more particularly, to an electronic apparatus which may prevent a loss of an initial voice by reducing input time of a voice for voice recognition and a controlling method thereof.

2. Description of Related Art

An electronic apparatus which receives and processes an audio signal receives the audio signal via a microphone and processes the received audio signal via hardware having various stages and software with a hierarchy structure.

A software hierarchy structure may include various stages performed by a kernel, a device driver, a middleware, an application, etc. The various stages may be used to process varied signals input from various hardware such as a radio frequency (RF) signal, a. Bluetooth (BT) signal, a Wi-Fi signal, or the like.

A user starts inputting an audio signal after pushing a button on a remote controller to activate an external audio input using an audio input device such as a remote controller. When a user pushes a button on a remote controller, a request for initiation of an audio input is transmitted from a main device through a wireless signal, such as a BT, a Wi-Fi, etc., and a main device transfers the request to an application through several stages of a software layer. Then, an application sends, to a hardware device, a command to transmit audio data when initiating an internal process (e.g., initiating an operation). The command descends the software layer, and is transferred to a remote controller, and a remote controller can collect and transmit audio data only after receiving the command.

In other words, in the related art, a control command is transmitted and processed by every layer, from the lowest layer to the highest layer in the software hierarchy, and thus, there has accordingly been a problem of a loss of an audio signal inputted at an initial stage due to the processing time consumed in each layer.

SUMMARY

One or more example embodiments relate to an electronic apparatus which may prevent a loss of an initial audio input by changing a path for transferring a voice input request and a controlling method thereof.

According to an aspect of an example embodiment, there is provided an electronic apparatus including: a communicator configured to communicate with an external apparatus including a microphone; a storage configured to store a voice recognition application and a middleware which relays the voice recognition application; and a processor configured to, in response to receiving a voice input initiation signal from the external apparatus through the communicator, control the communicator to generate a microphone activation signal for activating the microphone using the middleware, transmit the generated microphone activation signal to the external apparatus, generate a voice recognition application signal for loading the voice recognition application, and initiate an operation of the voice recognition application.

The processor may be further configured to, in response to the microphone being activated and an audio signal being received, operate a voice engine, and process the audio signal regardless of whether or not an operation of the voice recognition application is completed.

The processor may be further configured to control the middleware to transmit the received audio signal to the voice recognition application in response to receiving the audio signal.

The electronic apparatus may further include a display configured to display a user interface (UI), and the processor may be further configured to control the display to display a corresponding UI in response to an operation of the voice recognition application being completed.

The processor may include a buffer configured to store an audio signal, and may be further configured to store the audio signal in the buffer in response to receiving the audio signal between a time when a signal for activating the microphone is transmitted and a time when an operation of the voice recognition application is completed.

The processor may be further configured to determine whether or not to process the audio signal stored in the buffer by combining the audio signal stored in the buffer with a currently received audio signal based on an interval between a time when the stored audio signal is inputted and a time when the currently received audio signal is inputted, determine whether or not an operation of the voice recognition application is completed, and determine whether or not the currently received audio signal is received from a same source.

The processor may be further configured to, in response to the stored audio signal and the currently received audio signal being received from sources which use a same communication method, determine that the currently received audio signal is received from a same source, and combine the stored audio signal with the currently received audio signal.

The processor may be further configured to generate the microphone activation signal and the voice recognition signal simultaneously.

The processor may be further configured to generate the microphone activation signal and the voice recognition signal in parallel.

According to an aspect of another example embodiment, there is provided an electronic apparatus including: an input interface configured to receive a command; a microphone configured to generate an audio signal; a storage configured to store a voice recognition application and a middleware which relays the voice recognition application; and a processor configured to, in response to receiving a voice input initiation signal generated using the middleware, generate a microphone activation signal for activating the microphone, transmit the generated signal to the microphone, generate a voice recognition application signal for loading the voice recognition application, and initiate an operation of the voice recognition application.

The processor may be further configured to, in response to the microphone being activated and the audio signal being received, operate a voice engine, and process the received audio signal regardless of whether or not an operation of the voice recognition application is completed.

According to an aspect of yet another example embodiment, there is provided a method of controlling an electronic apparatus, the method including: generating a microphone activation signal for activating a microphone using a middleware which relays a voice recognition application in response to receiving a voice input initiation signal from an external apparatus including a microphone; transmitting the generated microphone activation signal to the external apparatus; generating a voice recognition application signal for loading the voice recognition application using the middleware; and initiating an operation of the voice recognition application.

The may further include: in response to receiving an audio signal input by the activated microphone, operating a voice engine; and processing the received audio signal regardless of whether or not an operation of the voice recognition application is completed.

The processing of the received audio signal may include transmitting, by the middleware, the received audio signal to the voice recognition application in response to the audio signal being received.

The method may further include displaying a corresponding user interface (UI) in response to an operation of the voice recognition application being completed.

The method may further include storing the received audio signal in response to the audio signal being received between a time when a signal for activating the microphone is transmitted and a time when an operation of the voice recognition application is completed.

The method may further include determining whether or not to process the stored audio signal by combining the stored audio signal with a currently received audio signal based on an interval between a time when the stored audio signal is inputted and a time when the currently received audio signal is inputted; determining whether or not an operation of the voice recognition application is completed; and determining whether or not the currently received audio signal is received from a same source.

The determining whether or not the currently received audio signal is received from the same source may include determining whether or not the stored audio signal and the currently received audio signal are received from sources which use a same communication method, and the method may further include combining the stored audio signal with the currently received audio signal in response to determining that the currently received audio signal is received from the same source.

According to an aspect of still another example embodiment, there is provided a method of controlling an electronic apparatus including an input interface, a microphone, and a storage configured to store a voice recognition application and a middleware which relays the voice recognition application, the method including: receiving a command via the input interface; generating, in response to the command being received via the input interface, a voice input initiation signal using the middleware; generating, in response to the voice input initiation signal being generated using the middleware, a microphone activation signal for activating the microphone; activating the microphone based on the microphone activation signal; generating an audio signal by the microphone; generating a voice recognition application signal for loading the voice recognition application using the middleware; and initiating an operation of the voice recognition application.

According to various example embodiments, an electronic apparatus may prevent a loss of an initial voice input of a user by changing a path for transferring a signal requesting voice input. In addition, the electronic apparatus may accept only a voice that a user intended to input by prevention of an inverse phenomenon through a voice validity determination.

DETAILED DESCRIPTION

Hereinafter, example embodiments will be described in more detail with reference to the accompanying drawings. In the following description, well-known functions or constructions may not described in detail because they would obscure the application with unnecessary detail. The terms used in an example embodiment are defined in consideration of a function described in an example embodiment, and the terms may vary according to an intention of a technician practicing in the pertinent art, an advent of new technology, etc. Accordingly, the terms used in the description should be defined based on overall contents of example embodiments.

Terms such as "first" and "second" may be used to identify various elements, but the elements should not be limited by these terms. The terms used in the following description are provided to explain various example embodiments and are not intended to limit the scope of rights. For example, a first element may be named a second element without departing from the scope of right of the various example embodiments, and similarly, a second element may be named a first element. The term "and/or" includes a combination of a plurality of described relevant items or any item of a plurality of described relevant items.

The terms used throughout the present disclosure are for the purpose of describing particular example embodiments and are not intended to limit the present disclosure. A singular term includes a plural form unless it is intentionally written that way. In addition, it should be understood that the terms "include" or "have" used in the example embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

Figure 1:
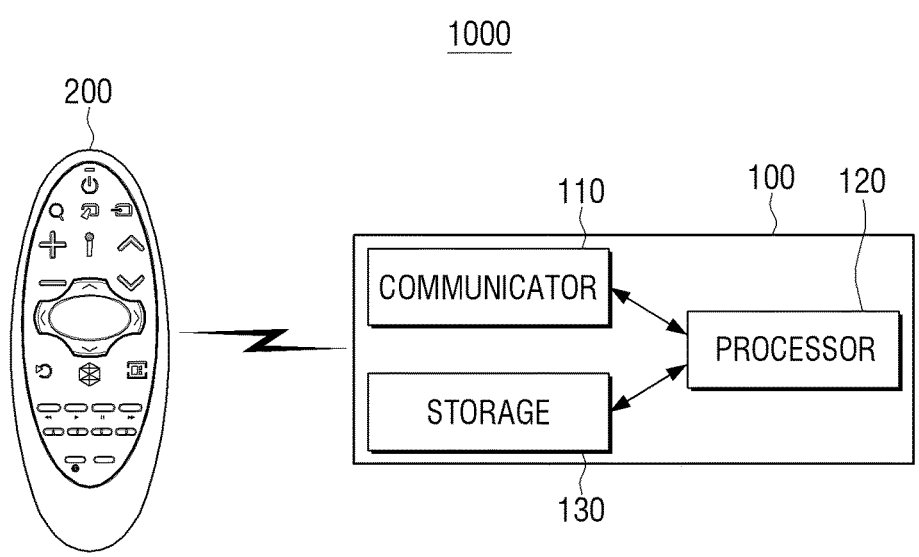
FIG. 1 is a diagram schematically illustrating a configuration of an electronic apparatus according to an example embodiment.

FIG. 1 is a diagram which schematically illustrates an overall configuration of the electronic apparatus 100 according to an example embodiment. The electronic apparatus 100 according to the example embodiment of FIG. 1 may communicate with an external apparatus 200 which includes a microphone. For example, the electronic apparatus 100 may be implemented as a display apparatus such as a TV, an audio apparatus such as a network sound bar, or another electronic device which can perform a voice recognition function such as an Internet of Things (IoT) hub, a home network hub, a mobile apparatus, a navigation apparatus, or the like. FIG. 1 illustrates an example embodiment in which a function of receiving an external voice is performed via the external apparatus 200, but it is also possible that the electronic apparatus 100 itself performs the function of receiving an external voice.

The external apparatus 200 may activate a microphone 230 based on an audio request signal (a microphone activation signal) transmitted by and received from the electronic apparatus 100, and the external apparatus 200 may receive an external voice through the activated microphone 230, and transmit the received external voice to the electronic apparatus 100. For example, the external apparatus 200 may be implemented as a remote controller, a mobile apparatus such as a smart phone, a wearable apparatus such as a smart watch, a pointing device or the like.

Figure 2:
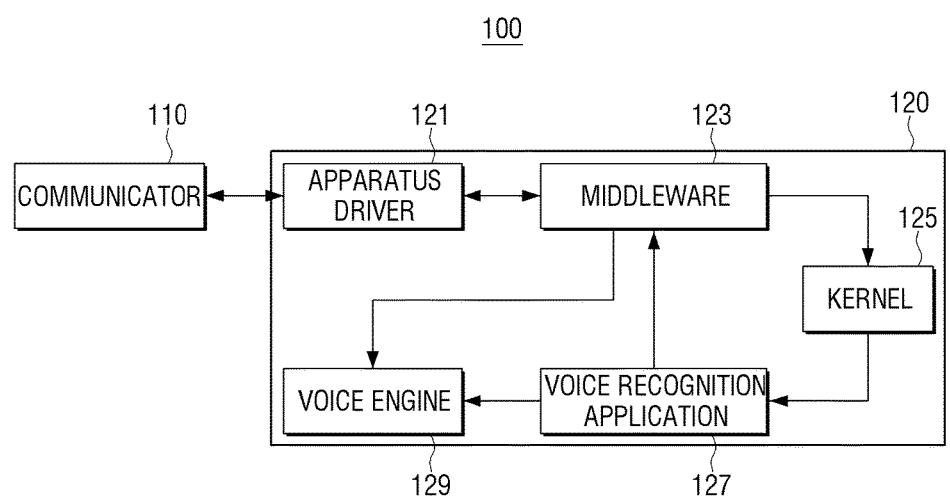
FIG. 2 is a diagram illustrating a processor of an electronic apparatus according to an example embodiment.

FIG. 2 is a block diagram illustrating a configuration of the electronic apparatus 100 according to example embodiment. In particular, in order to describe an operation of the processor 120, FIG. 2 illustrates a software hierarchy structure that a processor 120 can load from a storage 130 and implement. The software stored in the storage 130 may include a hierarchy structure having a plurality of layers such as an apparatus driver 121, a middleware 123, a kernel 125, a voice recognition application 127 and a voice engine 129.

A communicator 110 may communicate with the external apparatus 200. For example, the communicator 110 may receive a control signal and an audio signal from the external apparatus 200, and transmit an audio request signal (a microphone activation signal) to the external apparatus 200.

The communicator 110 may convert an RF signal received from the external apparatus 200 into a digital signal, and transfer the converted signal to the processor 120.

To this end, the communicator 110 may include various communication modules such as a near field wireless communication module, a wireless communication module, or the like. The near field wireless communication module is a communication module which performs communication with the external apparatus 200 located nearby via a communication protocol such as a Bluetooth (BT), a Bluetooth Low Energy (BLE), ZigBee or the like. Also, the wireless communication module is a module which performs communication by connecting to an external network according to a wireless communication protocol such as a Wi-Fi, an Institute of Electrical and Electronics Engineers (IEEE) standard, or the like. The wireless communication module may further include a mobile communication module which performs communication by accessing a mobile communication network according to various mobile communication standards such as a 3rd Generation (3G), a 3rd Generation Partnership Project (3GPP), a Long Term Evolution (LTE), a LTE Advanced (LTE-A) or the like.

The processor 120 may perform a voice recognition function. For example, the processor 120 may generate a signal for activating a microphone 230 of the external apparatus 200 using the middleware 123, thereby reducing time required to initiate input of a voice. The processor 120 may also examine attributes concerning effectiveness of the received audio signal.

The processor 120 may implement software having a hierarchy structure. The processor 120 may transmit and process a control signal, etc., by going through each layer of software.

The apparatus driver 121 is an element which is included in a hardware layer. For instance, the apparatus driver 121 may transmit various types of signals to and receive various types of signals from the external apparatus 200 by controlling the communicator 110. The apparatus driver 121 may transmit a converted digital signal which has been received from the communicator 110 to the middleware 123.

The middleware 123 layer may relay a voice recognition application or the like. The middleware 123 layer may include a middleware such as a signal handler. The signal handler may set a transfer path according to a packet analysis of a digital signal, a data processing and a data type.

For example, when a control signal (e.g., an initiation signal for voice input) is received from the external apparatus 200, the middleware 123 layer may transmit the received control signal to a kernel 125 layer and initiate an operation of a voice recognition application 127, and simultaneously generate an audio request signal (a microphone activation signal) and transmit the generated signal to the same hardware layer such as the apparatus driver 121. That is, generation and transmission of a microphone activation signal may be performed in the middleware 123 layer.

As another example, when an audio signal is received from the external apparatus 200, the middleware 123 layer may transmit the received audio signal to an application layer. The middleware 123 layer may also process the received audio signal by operating a voice engine 129 regardless of an operation of the voice recognition application 127.

The kernel 125 layer may include a kernel such as an event handler. The event handler may transmit various events occurred in the electronic apparatus 100. For example, in the case in which a received control signal is data related to pressing a voice button, the event handler may generate a corresponding event and transmit the event to a certain application.

A voice recognition application 127 and a voice engine 129 are included in an application layer. The voice recognition application 127 is an application program in charge of a function related to a voice recognition process. In other words, the voice recognition application 127 is a program which substantively processes a user voice input. A voice recognition application 127 may operate the voice engine 129 when an event is received.

The voice engine 129 may process voice data. For instance, the voice engine 129 may process audio data transmitted by a signal handler, which is the middleware 123. The voice engine 129 may also receive an operation command from the signal handler, which is the middleware 123, not from the voice application 127. Hence, the voice engine 129 may process received audio data before the voice recognition application 127 is implemented.

The voice engine 129 may itself process audio data, and transmit audio data to the external server through a separate communicator. The voice engine 129 may also receive a result value processed in an external server.

Figure 3:
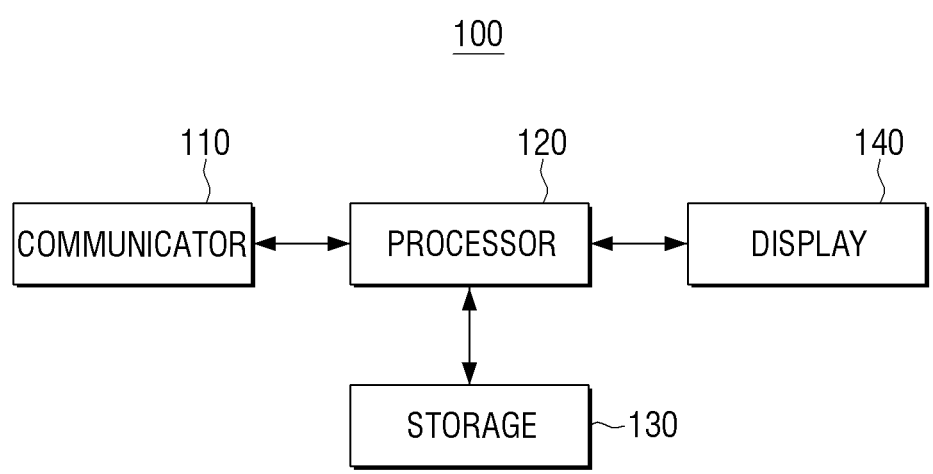
FIG. 3 is a block diagram illustrating a configuration of an electronic apparatus according to an example embodiment.

FIG. 3 is a block diagram illustrating a configuration of the electronic apparatus 100 according to an example embodiment. According to FIG. 3, the electronic apparatus 100 may further include a storage 130 and a display 140, in addition to the communicator 110 and the processor 120.

The storage 130 may store software which can be implemented in the processor 120. For example, the storage 130 may store software including the voice recognition application 127 and the middleware 123 which relays the voice recognition application 127.

Also, the storage 130 may temporarily store data which is currently being processed or ready to be processed in the processor 120. For instance, the storage 130 may store an audio signal which is processed in the voice recognition application 127.

The storage 130 may be implemented as a non-volatile memory such as a flash memory, a hard disk drive (HDD) or a solid stage drive (SSD). However, a part of the storage 130 may be implemented as a non-volatile memory such as a random access memory (RAM). For example, the storage 130 may temporarily store temporary data in a volatile memory area.

The display 140 may be implemented by a Liquid Crystal Display (LCD), an Organic Light Emitting Display (OLED) or a Plasma Display Panel (PDP), and may display various display screens which can be provided through the electronic apparatus 100.

For example, the display 140 may display a corresponding UI if an operation of the voice recognition application 127 is completed. Thus, a user may know that an operation of the voice recognition application 127 has been completed at least because the UI is displayed.

As an another example, the display 140 may display a text or image response message corresponding to a user voice to provide a conversational voice recognition function.

According to an example embodiment, an audio request signal may be transmitted to the external apparatus 200 at the same time when an operation of a voice recognition application is initiated. Accordingly, an activation time of the microphone 230 of the external apparatus 200 is shortened, and the time the audio data signal is inputted is also reduced. Therefore, the electronic apparatus 100 may receive an audio signal even before an operation of a voice recognition application is completed. When an audio signal is received between a time when an audio request signal is transmitted and a time when an operation of a voice recognition application is completed, the processor 120 may control the storage 130 to store the received audio signal.

In addition, the electronic apparatus 100 may additionally include an element such as an audio output interface which outputs a response message corresponding to a user voice in a form of voice. For example, the audio output interface may be implemented as a speaker or an output port.

Figure 4:
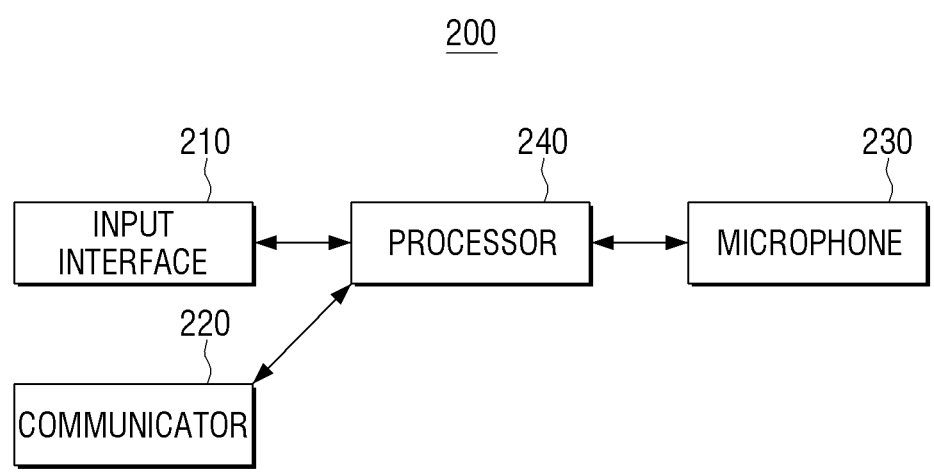
FIG. 4 is a block diagram illustrating a configuration of an external input device according to an example embodiment.

FIG. 4 is a block diagram illustrating a configuration of the external apparatus 200 according to an example embodiment. The external apparatus 200 may communicate with the electronic apparatus 100, and may constitute a voice input system 100 with the electronic apparatus 100. According to FIG. 4, the external apparatus 200 may include an input interface 210, a communicator 220, the microphone 230 and a processor 240.

The input interface 210 performs a function of receiving a user command input. The input interface 210 may be implemented as a button, a touch pad, a widget, a keypad, or the like. Also, the input interface 210 may receive various user commands by varying methods for pushing a same button. For instance, the input interface 210 may include a voice recognition button. When a user pushes the voice recognition button, the external apparatus 200 may transmit a control signal to the electronic apparatus 100 which notifies that the voice recognition button has been inputted. As another example, in the case in which the external apparatus 200 is a mobile apparatus such as a smartphone, when a user pushes an icon which indicates an application for performing a voice recognition function, the external apparatus 200 may transmit a control signal for initiating a voice recognition function to the electronic apparatus 100.

The communicator 220 may transmit a signal to, and receive a signal from, the electronic apparatus 100, which is a control object. The communicator 220 is configured as a wireless communication module, and performs a wireless communication function with the electronic apparatus 100. For example, the communicator 220 may transmit a control signal corresponding to a button input in the input interface 210, an audio signal received in the microphone 230, etc., to the electronic apparatus 100. Also, the communicator 220 may receive an audio request signal from the electronic apparatus 100.

The communicator 220 may communicate with the electronic apparatus 100 by various communication methods. The communicator 220 may transmit an infrared (IR) signal to the electronic apparatus 100. An IR signal is a unilateral communication, therefore, the communicator may include various additional communication chips or modules which support a wireless communication to perform a bilateral communication. For example, the communicator 220 may include a chip which operates by a method of a wireless LAN, a Wi-Fi, a Bluetooth (BT), a Near Field Communication (NFC).

The microphone 230 may receive a user voice while the microphone 230 is activated. For instance, the microphone 230 may be formed integrally in a way that the microphone 230 is integrated into an upper part of the external apparatus 200, or in a front surface direction or in a side direction toward the external apparatus 200.

The processor 240 may control an overall configuration of the external apparatus 200. The processor 240 may include a Central Processing Unit (CPU) and a Read Only Memory (ROM), which stores data and a module for controlling the external apparatus 200. As another example, the processor 240 may be implemented through a Micro Controller Unit (MCU) to implement miniaturization.

When an audio request signal is received from the electronic apparatus 100, the processor 240 activates and controls the microphone 230 to receive an audio signal. The processor 240 may also control the communicator 220 to transmit the audio signal received through the microphone 230 to the electronic apparatus 100.

Figure 5:
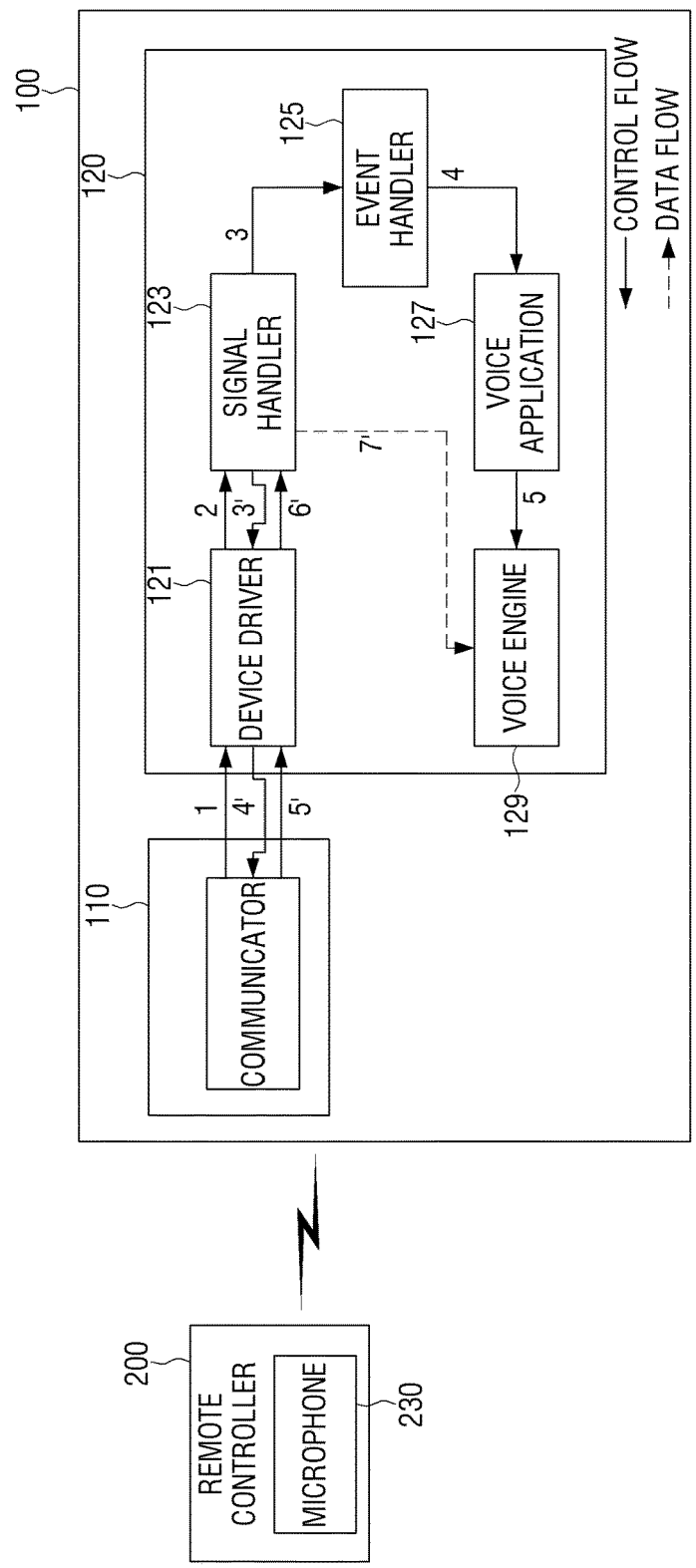
FIG. 5 is a diagram illustrating a control signal and a data flow in an electronic apparatus according to an example embodiment.

FIG. 5 is a diagram illustrating a control signal and a data flow in the electronic apparatus 100 according to an example embodiment. In FIG. 5, an order of a control signal flow and an order of a data signal flow are marked by numbers. For example, 3 and 3' indicate that a signal handler simultaneously transmit signals, and each path is neither related to each other nor needed a synchronization.

The communicator 110 may receive a control signal from the external apparatus 200 and transfer the control signal to the apparatus driver 121, which is a hardware layer of the processor 120. For example, the communicator 110 may convert a BT signal into a digital signal and transfer the converted signal to the apparatus driver 121. Then, the apparatus driver 121 may transfer the received control signal (a digital signal) to a signal handler 123, which is a middleware layer.

The signal handler 123 may analyze and process the received digital signal, and set a transfer path according to a type of data. For example, in the case in which a type of data corresponds to a button input which is for voice recognition and processing of an audio signal, the signal handler 123 may transfer the data to an event handler 125, which is a kernel layer (step 3), and the signal handler 123 may also transfer an audio request signal to the apparatus driver 121 at the same time (step 3'). The audio request signal is transmitted to the external apparatus 200 via the apparatus driver 121 and the communicator 110 (step 4'). The external apparatus 200 which has received the audio request signal may receive an audio signal input by activating the microphone 230.

The external apparatus 200 may transmit the received audio signal to the electronic apparatus 100. The audio signal transmitted from communicator 110 may be transferred to the signal handler 123 via the apparatus driver 121 (step 5' and step 6'). The signal handler 123 may, in the case in which the received signal is an audio signal, transfer the received signal to a voice engine 129 (step 7'). As another example, the signal handler 123 may transfer the received audio signal to a voice recognition application 127, not to the voice engine 129.

The event handler 125 may generate an event and control an voice recognition application to implement its operation (step 4), and the voice recognition application 127 may operate and control the voice engine 129 to process audio data (step 5). While the above operation is performed, the operations of step 3' and step 7' can also be performed, and hence, the electronic apparatus 100 may prevent loss of an initial voice input of a user.

Figure 6:
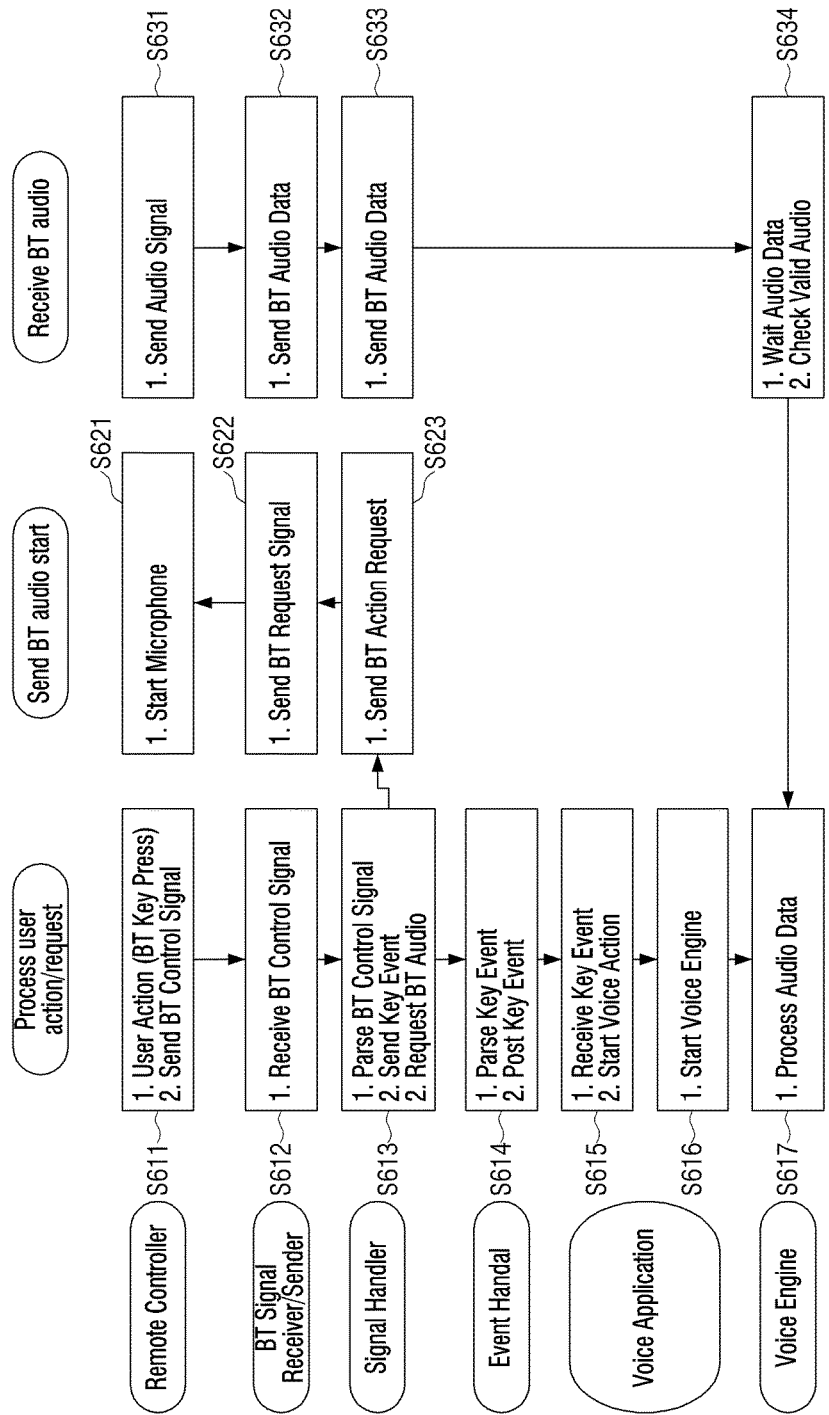
FIG. 6 is a diagram illustrating an operation of an electronic apparatus according to an example embodiment.

FIG. 6 is a diagram illustrating an operation of the electronic apparatus 100 according to an example embodiment. FIG. 6 illustrates an example in which the electronic apparatus 100 and a remote controller, which is the external apparatus 200, communicate by transmitting and receiving a signal and data to and from each other by a BT communication method. However, the communication method between the electronic apparatus 100 and the external apparatus 200 is not limited to the BT communication method.

When a user provides an input (e.g., a voice recognition button) of the external apparatus 200, the external apparatus 200 may transmit a control signal to the electronic apparatus 100 by a BT communication method.

A BT signal transceiver in the electronic apparatus 100 may receive a control signal which the external apparatus 200 transmitted, and the communicator 110 may transmit the received control signal to the signal handler 123, which is a middleware, via a hardware layer of the processor 120.

The signal handler 123 may analyze a control signal. For example, when a control signal corresponding to a button related to a voice recognition function is received, the signal handler 123 may generate a corresponding event and transfer the generated event to the event handler 125, which is a kernel, and the signal handler 123 may request a BT audio at the same time (S613).

The signal handler 123 may generate a key event, and when transferring the generated event to the event handler 125, the signal handler 123 may also transmit a BT audio request signal to the external apparatus 200 at the same time. Hence, S623 may proceed at the same time when S614 proceeds.

Describing an internal operation of the electronic apparatus 100, the event handler 125 may analyze a key event, post the key event and control the voice recognition application 127 to start its operation (S614 and S615), and the voice recognition application 127 may operate the voice engine 129 (S616).

While the voice recognition application 127 is operated inside the external apparatus 100, the communicator 110 may request an audio request signal from the external apparatus 200 (S622), and the external apparatus 200, which has received the audio request signal, may activate the microphone 230.

The external apparatus 200 may receive an audio signal through the activated microphone 230 (S631), and transfer the audio signal transmitted to the electronic apparatus 100. The communicator 110 may transfer the received audio signal to the processor 120, and the signal handler 123, which is a middleware layer, may transfer the received audio signal to the voice engine 129 (S633).

The voice engine 129 may process the audio signal after proceeding with an examination of attributes indicating effectiveness of the received audio signal (S617).

Figure 7:
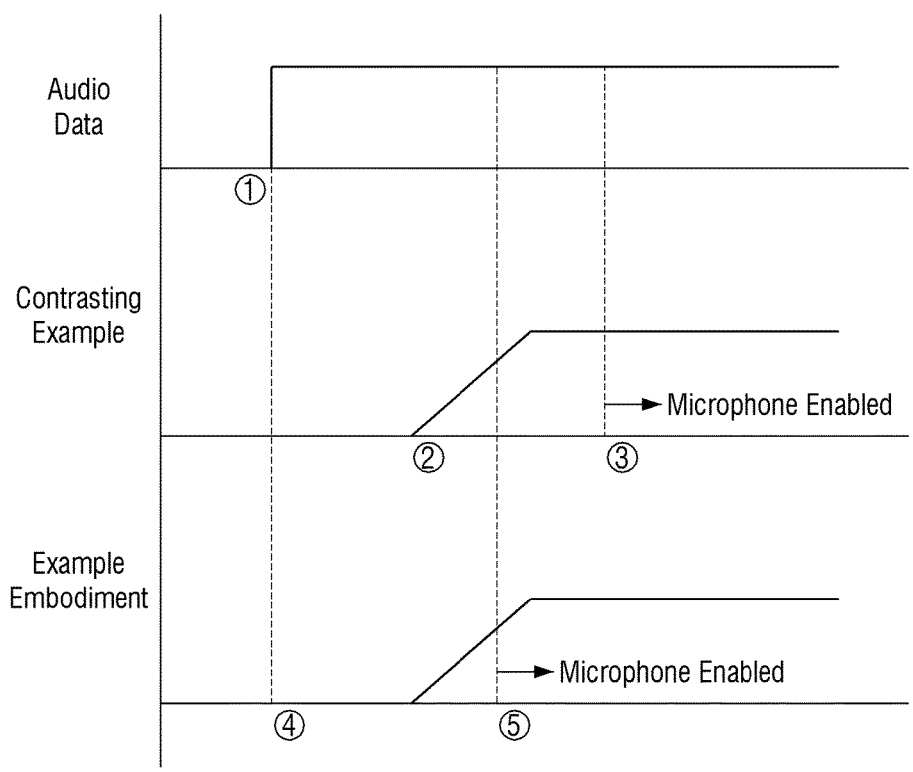
FIG. 7 is a diagram illustrating a time point at which a voice can be inputted according to an example embodiment.

FIG. 7 is a diagram illustrating a time point when a voice can be inputted in the electronic apparatus 100 according to an example embodiment.

In the graph, the point where a diagonal line begins is when the voice recognition application 127 starts operating, and the point where the diagonal line ends is when the operation of the voice recognition application 127 is completed. The point where the diagonal line ends may be when a UI (or an indicator) is displayed.

In the contrasting example, an audio request signal is generated in an application layer, and the voice recognition application 127 starts operating simultaneously when the generated signal is transferred (a time point ②). Hence, while the voice recognition application 127 operates and even after the voice recognition application 127 is implemented and a UI is displayed, an audio signal cannot be received for a while at an initial state. That is because a user voice can be inputted only after the time point ③ at which the microphone is activated. In other words, even if a user utters before the time point ③, the electronic apparatus 100 cannot receive a voice input.

Meanwhile, the electronic apparatus 100 may resolve the problem of a loss of an initial voice according to an example embodiment. The electronic apparatus 100 according to an example embodiment generates an audio request signal in a middleware layer, not in an application layer. Therefore, the electronic apparatus 100 may transmit an audio request signal to the external apparatus 200 at an earlier time point ④ than the time point when an audio request signal is generated in an application layer. Hence, a loss of an initial user voice may be prevented because an microphone is already activated (time point ⑤) before a UI is displayed (before an operation of an voice recognition application is completed).

Figure 8:
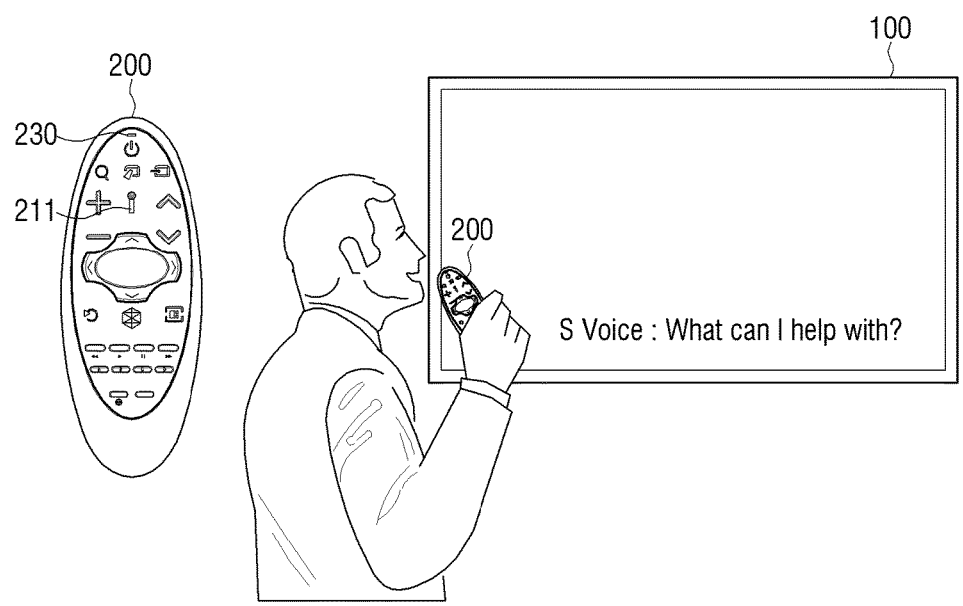
FIG. 8 is a diagram illustrating an example in which a user interface (UI) is displayed.

In the electronic apparatus 100 including the display 140, to reach the time point at which the voice recognition application 127 is implemented and can process a voice may be regarded as that a UI indicating that a voice recognition can be performed is displayed as shown in FIG. 8. In the case of the electronic apparatus 100 which does not include the display 140, a time point when a voice recognition processing can be performed may be notified to a user by an indicator such as an LED.

In the prior art, a voice recognition function could not be performed even after an UI (an indicator) is displayed (that is, after a voice recognition application is loaded and its operation is completed) because voice input cannot be made for a while at an initial state. However, in the electronic apparatus 100 according to an example embodiment, there is no loss of an initial user voice because voice input can be made earlier than displaying a UI (or an operation of a voice recognition application being completed).

As illustrated in FIG. 8, a user may push the voice recognition button 211 of the external apparatus 200 to activate a voice recognition function. For instance, the button may be implemented by various forms of a button such as a touch button, a soft key, a hard key, or the like.

As another example embodiment, the external apparatus 200 may be implemented by a mobile apparatus and a wearable apparatus such as a smartphone, a smart watch, or the like. The motion of clicking an icon for activating an audio function application, which is displayed on a smartphone screen, may correspond to the motion of pushing a voice recognition button of a remote controller.

The electronic apparatus 100 according to an example embodiment may process a user voice input not only after a UI for notifying that the voice recognition application 127 is implemented, but also during a certain period of time before a UI is displayed, as illustrated in FIG. 8.

In the related art, a user voice could not be processed for a certain period of time at an initial state, even after a UI is displayed. However, the electronic apparatus 100 according to an example embodiment transmits a signal for activating the microphone 230 in the middleware layer preemptively, hence, the electronic apparatus 100 may process a user voice after the time point when the microphone 230 is activated, even before a UI for notifying that an operation of the voice recognition application is completed is displayed.

For example, when the signal handler 123, which is a middleware, generates an audio request signal for activating the microphone 230, and the signal handler 123 may also generate a signal for operating the voice engine 129. Therefore, the electronic 100 according to an example embodiment may process a voice input even before an operation of a voice recognition application is completed.

Figure 9:
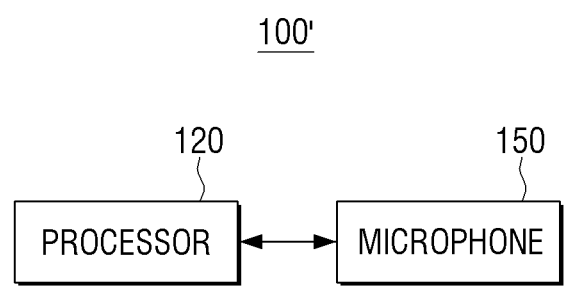
FIG. 9 is a block diagram briefly illustrating a configuration of an electronic apparatus according to an example embodiment.

FIG. 9 is a block diagram briefly illustrating a configuration of an electronic apparatus 100' according to an example embodiment. The electronic apparatus 100' includes a microphone 150 in a main body of the electronic apparatus 100.

The microphone 150 may be formed integrally into an upper part of the electronic apparatus 100, or in a front surface direction or in a side direction toward the electronic apparatus 100. The microphone 150 may be activated to correspond to an audio request signal, and the activated microphone 150 may receive an audio signal input such as a user voice.

Figure 10:
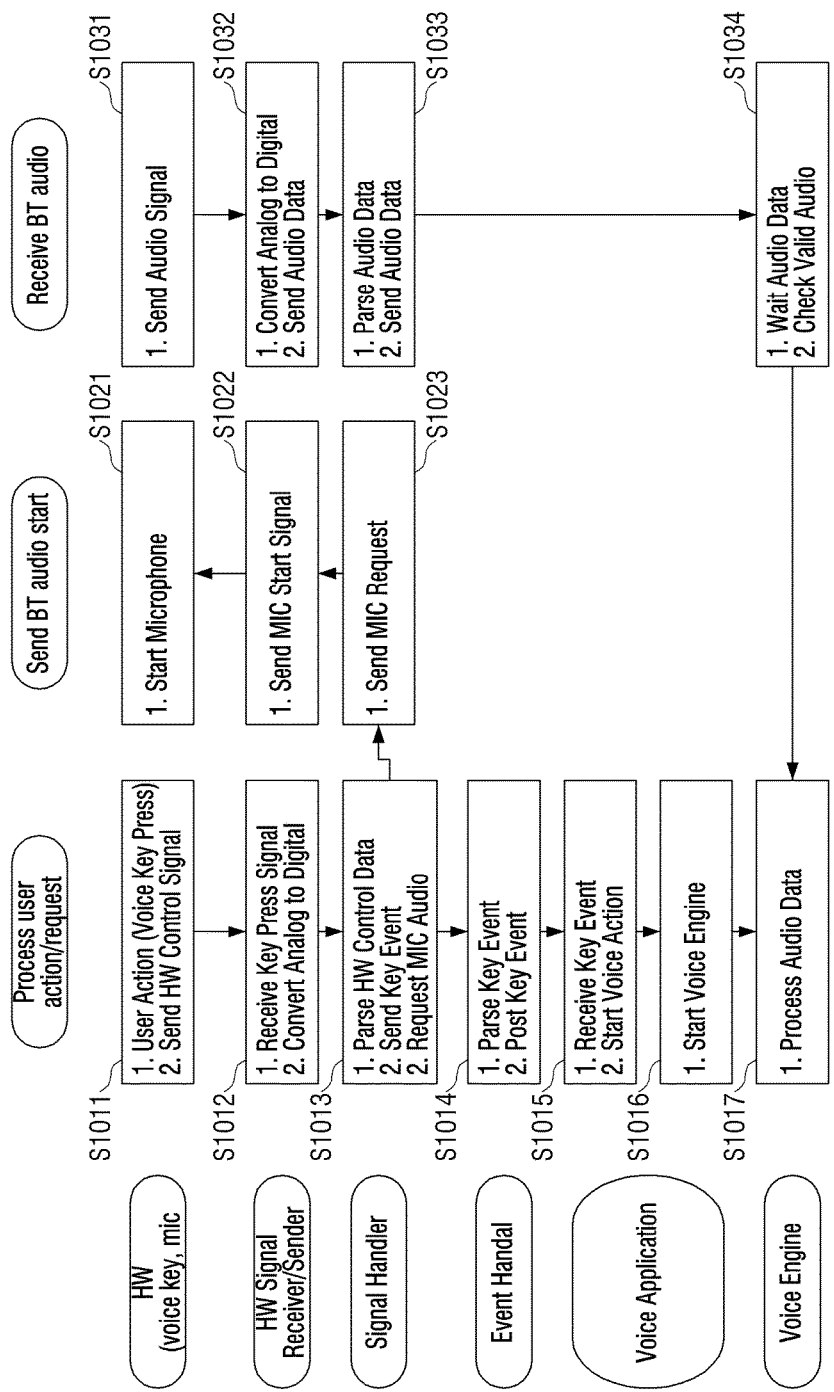
FIG. 10 is a diagram illustrating an operation of an electronic apparatus according to an example embodiment.

FIG. 10 is a diagram illustrating an operation of the electronic apparatus 100' according to another example embodiment. FIG. 10 presupposes an example in which the microphone 150 is included in the electronic apparatus 100' as one element. In the case of an integrated form also, the signal handler 123, which is a middleware, may transfer an event signal to the event handler 125, which is a kernel, in response to a voice key input, and transfer an audio request signal for activating the internal microphone 150 to the internal microphone 150 simultaneously.

When a user pushes a button (e.g., a voice recognition button), an input interface may transmit a control signal to the processor 120. Also, a hardware signal transceiver, which is a hardware layer, may convert the received signal into a digital signal and transfer the converted signal to a middleware layer (S1012).

The signal handler 123 may analyze a hardware control signal and perform a corresponding operation. The signal handler 123 may generate a key event and transfer the generated event to the event handler 125, which is a kernel. At the same time, the signal handler 123 may request an audio from the microphone 150 (S1013).

The signal handler 123 may generate a key event, and when transmitting the generated event to the event handler 125, the signal handler 123 may also transmit an audio request signal to the microphone 150 at the same time. Hence, S1023 may proceed at the same time when S1014 proceeds.

The event handler 125 may analyze a key event, post the key event and control the voice recognition application 127 to start its operation (S1014 and S1015). The voice recognition application 127 may operate the voice engine 129 (S1016).

While the voice recognition application 127 is operated, a hardware signal transceiver may transmit an audio request signal to the internal microphone 150 (S1022). The microphone 150 may be activated by receiving the audio request signal (S1023).

The activated microphone 150 may receive an audio signal such as a user voice (S1031), and the microphone 150 may transmit the audio signal received in the hardware signal transceiver. The hardware signal transceiver may convert an audio signal into a digital signal and transfer the converted signal to the signal handler 123, which is a middleware layer (S1032). Then, the signal handler 123 may transfer the received audio signal to the voice engine 129 (S1033).

The voice engine 129 may process the audio signal (S1017) after examining attributes indicating effectiveness of the received audio signal (S1034).

Through the above, also in the integrated apparatus 110', an audio request signal is transferred to the microphone 150 before an operation of a voice recognition application is completed (before a UI is displayed), and accordingly, time required to activate the microphone 150 may be reduced.

Figure 11:
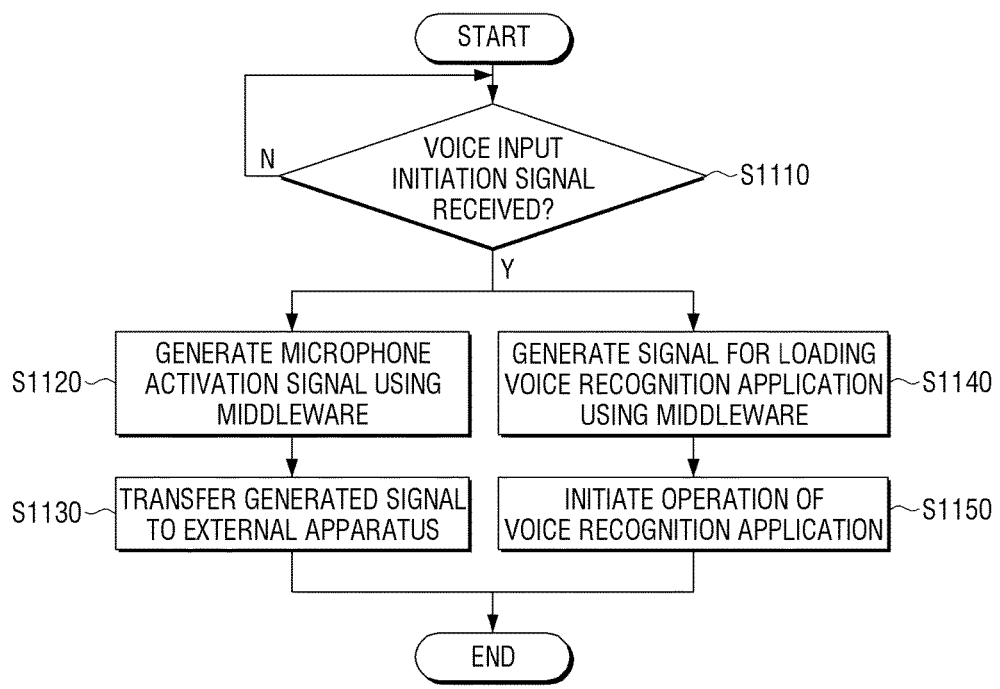
FIG. 11 is a diagram illustrating a method of controlling an electronic apparatus according to an example embodiment.

FIG. 11 is a diagram illustrating a method for processing an audio signal in the electronic apparatus 100 according to an example embodiment.

When an initiation signal for voice input is received (S1110-Y), the electronic apparatus 100 may proceed with a stage in which a microphone of the external apparatus 200 is activated using a middleware, and also proceed with in parallel a stage in which an operation of the voice recognition application is initiated. For example, the initiation signal for voice input may be a signal which indicates activation of a voice recognition button of the external apparatus 200.

The electronic apparatus 100 may generate a signal for activating a microphone of the external apparatus 200 using a middleware (S1120). Then, the electronic apparatus 100 may transmit the generated microphone activation signal to the external apparatus (S1130). The external apparatus 200 which has received the audio request signal may receive an audio signal by activating a microphone.

Also, the electronic apparatus 100 may generate a signal for loading a voice recognition application using a middleware (S1140), and initiate an operation of the voice recognition application (S1150).

The stages of S1120~S1130 and the stages of S1140~S1150, as described above, may be proceeded in parallel. The electronic apparatus 100 may reduce time for activating a microphone by processing an initiation signal for voice input in the middleware layer, without transferring the signal all the way to the application layer of the software hierarchy structure. Accordingly, the electronic apparatus 100 according to an example embodiment reduces a loss of an initial voice input.

Figure 12:
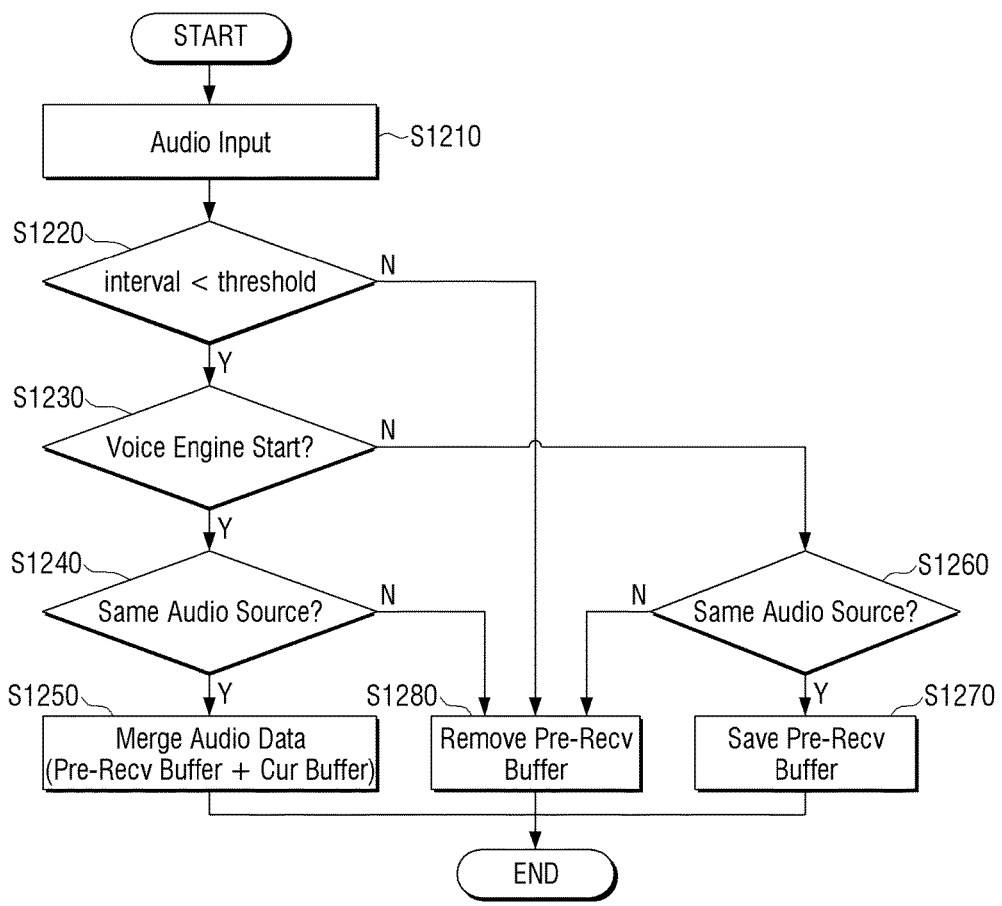
FIG. 12 is a diagram illustrating a process of determination of audio signal validity in an electronic apparatus according to an example embodiment.

FIG. 12 is a diagram illustrating a process of determining attributes indicating effectiveness of an audio signal. In the electronic apparatus 100 according to an example embodiment, an input time of audio data is moved forward due to a preemptive transmission of an audio request signal, and therefore, an inverse phenomenon in which voice data is received before an operation of the voice recognition application 127 is completed may occur in the voice engine 129.

In order to prevent the above, the voice engine 129 may select only valid data through a function of determining attributes indicating effectiveness of audio data which is currently inputted, and process only the selected data.

The electronic apparatus 100 may, when an audio signal is inputted (S1210), compare an interval between received audio packet data (an interval between the time point when a stored audio signal is inputted and the time point when a currently received audio signal is inputted) with a predetermined value (S1220).

In the case in which the interval is less than the predetermined value (S1220-Y), the electronic apparatus 100 may determine whether or not the voice engine 129 has been operated (S1230). Then, if the voice engine has been operated (S1230-Y), the electronic apparatus 100 may determine whether or not the audio signal is transmitted from a same source (S1240). For example, based on a communication method by which the audio signal is received, the electronic apparatus 100 may determine whether or not the audio signal has been transmitted from a same source. If the stored audio signal has been transmitted by a BT method, and if the currently received audio signal has been transmitted by a Wi-Fi method, the electronic apparatus 100 may determine that the audio signal has been transmitted from a different source.

If it is determined that the audio signal has been transmitted from a same audio source (S1240-Y), the electronic apparatus 100 may process the audio signal by combining a previously received audio signal (stored in a pre-recv buffer) with a currently processed audio signal (stored in a cur buffer). In contrast, if it is determined that the audio signal has been transmitted from a different audio source (S1240-N), the electronic apparatus 100 may eliminate the previously received audio signal, and only process the currently received audio signal (S1280).

In the case in which the interval is larger than the predetermined value (S1220-N), it is not likely that the audio signal has been transmitted from a same audio source. Hence, the electronic apparatus may eliminate the currently received audio signal, and only process the currently received audio signal (S1280).

If the voice engine has not been operated yet (S1230-N), the electronic apparatus 100 may determine that the audio signal has been transmitted from a same audio source (S1260). If it has been transmitted from a same audio source (S1260-Y), the electronic apparatus 100 may store a received audio signal (S1270). In contrast, if the audio signal has been transmitted from the different audio signal (S1260-N), the electronic apparatus 100 may eliminate a previously stored audio signal (S1280).

According to various example embodiments, a microphone may be preemptively activated by changing a transfer path of an audio request signal. In addition, an inverse phenomenon caused by reduced time in inputting an audio may be prevented through attributes indicating effectiveness examination. Therefore, the electronic apparatus according to various example embodiments may basically eliminate a loss of an audio data input which occurs due to a hierarchical structure of a processor.

The methods described above may be implemented as a form of program command that can be performed through various computer units, and be recorded in a computer readable medium. The computer readable medium may include a program command, a data file, a data structure or the like, alone or a combination thereof. The program commands recorded in the computer-readable medium may be designed for the example embodiments or be known to those skilled in a field of computer software. The examples of a computer readable medium include a hardware device which is specially configured to store and carry out a program command, e.g., a hard disk, a floppy disk, a magnetic media such as a magnetic tape, an optical media such as a CD-ROM or DVD, a magneto-optical media such as a floptical disk, a ROM, a RAM, a flash memory, or the like. The examples of program commands not only include machine codes which are made by a compiler, but also high-level language code which can be executed via a computer using an interpreter. The hardware device may be configured to operate as one or more software modules. Conversely, software modules may be configured to operate as a hardware device.

The foregoing example embodiments are merely exemplary and are not to be construed as limiting. The example embodiments can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An electronic apparatus comprising:
a communicator;
a storage storing a voice recognition application and a middleware that is a software layer between a hardware and the voice recognition application; and
a processor configured to:
based on receiving, through the communicator, a voice input initiation signal from an external apparatus including a microphone, control the middleware to generate a microphone activation signal for activating the microphone and a voice recognition application signal for initiating an operation of the voice recognition application;
control the communicator to transmit the microphone activation signal to the external apparatus; and
control the middleware to transmit the voice recognition application signal to the voice recognition application.

2. The electronic apparatus of claim 1, wherein the processor is further configured to:

based on the microphone being activated, receive an audio signal from the external apparatus through the communicator; and based on the audio signal being received, operate a voice engine, and process the audio signal, regardless of whether or not the operation of the voice recognition application is completed.

3. The electronic apparatus of claim 2, wherein the processor is further configured to, based on the audio signal being received, control the middleware to transmit the audio signal to the voice recognition application.

4. The electronic apparatus of claim 2, wherein the processor further comprises a buffer, and wherein the processor is further configured to store the audio signal in the buffer, based on the audio signal being received between a first time when the microphone activation signal is transmitted and a second time when the operation of the voice recognition application is completed.

5. The electronic apparatus of claim 4, wherein the processor is further configured to:

determine whether or not to process the audio signal stored in the buffer by combining the audio signal stored in the buffer, with a currently received audio signal, based on an interval between a third time when the audio signal stored in the buffer is inputted and a fourth time when the currently received audio signal is inputted;

determine whether or not the operation of the voice recognition application is completed; and determine whether or not the currently received audio signal is received from a same source.

6. The electronic apparatus of claim 5, wherein the processor is further configured to:

determine whether or not the audio signal stored in the buffer and the currently received audio signal are received from sources using a same communication method; and based on the audio signal stored in the buffer and the currently received audio signal being determined to be received from the sources using the same communication method, combine the audio signal stored in the buffer, with the currently received audio signal.

7. The electronic apparatus of claim 5, wherein the processor is further configured to, based on the audio signal stored in the buffer and the currently received audio signal being received from sources using a same communication method, combine the audio signal stored in the buffer, with the currently received audio signal.

8. The electronic apparatus of claim 1, further comprising a display configured to display a user interface (UI), wherein the processor is further configured to control the display to display the UI, based on the operation of the voice recognition application being completed.

9. The electronic apparatus of claim 1, wherein the processor is further configured to control the middleware to generate the microphone activation signal and the voice recognition signal simultaneously.

10. The electronic apparatus of claim 1, wherein the processor is further configured to control the middleware to generate the microphone activation signal and the voice recognition signal in parallel.

11. An electronic apparatus comprising:
an interface;
a microphone;
a storage storing a voice recognition application and a middleware that is a software layer between a hardware and the voice recognition application; and a processor configured to:
based on receiving a voice input initiation signal through the interface, control the middleware to generate a microphone activation signal for activating the microphone and a voice recognition application signal for initiating an operation of the voice recognition application;

control the interface to transmit the microphone activation signal to the microphone; and control the middleware to transmit the voice recognition application signal to the voice recognition application.

12. The electronic apparatus of claim 11, wherein the processor is further configured to:

based on the microphone being activated, receive an audio signal from the microphone; and based on the audio signal being received, operate a voice engine, and process the audio signal, regardless of whether or not the operation of the voice recognition application is completed.

13. A method of controlling an electronic apparatus, the method comprising:

based on receiving a voice input initiation signal from an external apparatus including a microphone, controlling a middleware to generate a microphone activation signal for activating the microphone and a voice recognition application signal for initiating an operation of a voice recognition application;

controlling a communicator to transmit the microphone activation signal to the external apparatus; and controlling the middleware to transmit the voice recognition application signal to the voice recognition application, wherein the middleware and the voice recognition application are corresponding to different layers included in a hierarchy structure of software of the electronic apparatus.

14. The method of claim 13, further comprising:
based on the microphone being activated, receiving an audio signal from the microphone; and based on the audio signal being received, operating a voice engine, and processing the audio signal, regardless of whether or not the operation of the voice recognition application is completed.

15. The method of claim 14, wherein the processing of the audio signal comprises, based on the audio signal being received, controlling the middleware to transmit the audio signal to the voice recognition application.

16. The method of claim 14, further comprising storing the audio signal, based on the audio signal being received between a first time when the microphone activation signal is transmitted and a second time when the operation of the voice recognition application is completed.

17. The method of claim 16, further comprising:
determining whether or not to process the audio signal that is stored by combining the audio signal that is stored, with a currently received audio signal, based on an interval between a third time when the audio signal that is stored is inputted and a fourth time when the currently received audio signal is inputted;

determining whether or not the operation of the voice recognition application is completed; and determining whether or not the currently received audio signal is received from a same source.

18. The method of claim 17, wherein the determining whether or not the currently received audio signal is received from the same source comprises determining whether or not the audio signal that is stored and the currently received audio signal are received from sources using a same communication method, and the method further comprises, based on the audio signal that is stored and the currently received audio signal being determined to be received from the sources using the same communication method, combining the audio signal that is stored, with the currently received audio signal.

19. The method of claim 17, wherein the determining whether or not the currently received audio signal is received from the same source comprises, based on the audio signal that is stored and the currently received audio signal being received from sources using a same communication method, combining the audio signal that is stored, with the currently received audio signal.

20. The method of claim 13, further comprising displaying a user interface (UI), based on the operation of the voice recognition application being completed.

\* \* \* \* \*